United States Patent Office 3,420,808
Patented Jan. 7, 1969

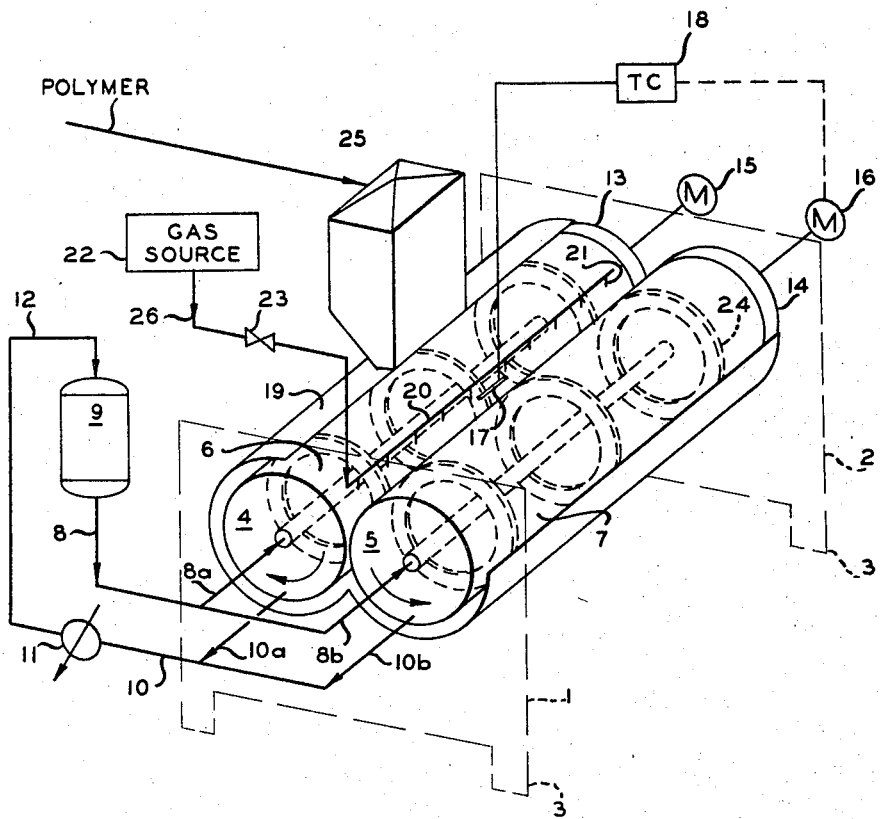

3,420,808
MILLING CIS POLYBUTADIENE AT TEMPERATURES BELOW 100 DEGREES F.
Clyde H. Mathis and Roy W. Siedenstrang, Borger, Tex., assignors to Phillips Petroleum Company, a corporation of Delaware
Filed Aug. 31, 1964, Ser. No. 393,112
U.S. Cl. 260—94.7
Int. Cl. B29b *3/00;* B29b *1/04;* C08d *5/00*
3 Claims

ABSTRACT OF THE DISCLOSURE

Maintaining rubber stock temperature during compounding of high cis content rubber at a temperature below 100° F. provides adequate bonding on the mill while avoiding gel formation and produces a compounded stock having satisfactory processing characteristics.

---

This invention relates to a novel method for the milling of polymers. In one aspect this invention relates to an improved process for the milling of polymers on conjugated dienes containing 4 to 10 carbon atoms. In another aspect this invention relates to a method for controlling milling temperature so as to avoid excessive temperatures.

In the milling of rubber, synthetic or natural, wherein there is formulated a recipe for the end use of the rubber, considerable heat is generated by the passage of the stock through the bite or space between the rolls. This generation of heat has been found to be particularly undesirable in the milling of cis type polymer such as cis 1,4-polybutadiene due to the forming of gels in the stock, or conversion to a hard processing state. In addition, at a temperature above 100° F., the cis-polybutadiene compounded stocks are too short and weak to bond on the roll mill. The rubber compounds have poor green tensile and give very rough extrusions.

We have now discovered that the hard processing state is avoided and that satisfactory milling can be obtained for such polymers with the avoidance of gel formation while at the same time achieving adequate bonding on the mill by milling the feedstock at a temperature below about 100° F., preferably below 80° F.

Accordingly, it is an object of the present invention to provide a process for the improved milling of polymeric compositions. Another object is to provide an improved process for the milling of cis 1,4-polybutadiene. A still further object is to provide a novel milling apparatus which allows satisfactory milling to be achieved thereon.

Other objects, aspects and the several advantages of the invention will be readily apparent to those skilled in the art from the following description, the appended claims, and the accompanying drawing, which is a diagrammatic view of a preferred process and apparatus for carrying out the invention.

As shown in the drawing, there is provided a mill having two end frames 1 and 2 supported upon suitable foundations 3. The rolls 4 and 5 are adjustable with respect to one another to vary the opening between the rolls at the bite. The rolls 4 and 5 are cored or drilled out to provide internal areas 6 and 7. Conduit 8 communicating with areas 6 and 7 via 8a and 8b and coolant from tank 9 provide circulation of coolant into the internal areas 6 and 7. Conduit 10 is operably associated internally with rolls 4 and 5 and lines 10a and 10b so as to remove coolant from the areas 6 and 7 of rolls 4 and 5. The spent coolant is then passed through line 10 to heat exchanger 11 where heat is removed and the coolant is then in condition for recycle to interior zones 6 and 7. A storage tank 9 is provided to assure that sufficient coolant is available for use in removing heat from the rolls. Suitable coolants which are useful for introduction into the rolls 4 and 5 include water, ammonia, dichlorodifluoroethane, propane, brine, oil, and the like.

At the point where the stock is fed into the mill, the feed roll is provided, if desired, with a plurality of longitudinal grooves to assist in the feeding-in operation. The rolls 4 and 5 are driven in the direction of the arrows shown by standard gear drives 13 and 14 actuated by motors 15 and 16. Roll 4 is driven faster than the roll 5, which causes the sheet to accumulate in a bank at the bite so as to effect the shearing during its passage through the rolls. A thermocouple 17 is in operable association with temperature controller 18 which in turn controls the relative rate of rotation of rolls 4 and 5 by varying the speed of motors 15 and 16. The thermocouple is so positioned to penetrate the bank so as to sense the temperature of the stock at a point above the bite. The milling of the stock at the desired low temperature level is achieved by regulating the relative rotation of the two rolls responsive to the sensed temperature.

The stock is introduced to the rolls 4 and 5 from chilling feed box 25 wherein the stock temperature is reduced to a temperature of below about 10° F. The feed box 25 can be located apart from the mill but for convenience to avoid excessive heat up of the stock is located as illustrated at the rear of the mill and feeds directly to the bank. The box is fastened to the upper side of a casement 19 which surrounds the lower side of the rolls and extends for any desirable distance along same. At the feed box the casement is relieved to provide a throat by which the polymer is fed into the bank. The function of the casement is to give a concentrated working to the polymer and to hold the polymer being milled against the surface of the rolls until it reaches the bite.

If desired, additional coolant can be applied to the polymer at the bite where considerable heat is generated by means of bar conduit 20 which extends along the bite and in close proximity to the polymer therein. Bar 20 has a plurality of outlets 21 thereon which serve to direct the coolant, preferably a gas which is introduced to conduit 21 from a source thereof 22, against the bank of rubber to supplement the cooling achieved by the coolant circulating within the rolls 4 and 5. Among the gases which can be employed are $CO_2$ or cold dehydrated air. Feed box 25 is cooled in the same manner as rolls 4 and 5 except that heat exchange is indirect through either internal or external coils, fins, and the like.

Any suitable nozzle or perforated pipe may be used to direct the air or other gas employed onto the rubber. As the air is released from compression it expands, and such expansion cools it, the temperature to which it is cooled depending upon the degree of expansion. The release valve 23 through which the air expands is preferably located where it is available for adjustment. Control of valve 23 can be achieved by temperature controller 18. After expansion, the temperature of the air may be, for example, as low as about 40° to 60° F., although lower temperatures may be used. Additional means, not shown, to confine the coolant in contact with the rubber can be employed if desired.

While the process has been illustrated by precooling the feedstock prior to introduction of same to the mill, it is within the scope of this invention to achieve all of the necessary cooling while the feedstock is on the mill. When the milling apparatus is so adapted to achieve the required mill temperature, the chilling feed box 25 can be omitted from the system.

A plurality of stiffening and heat transmission rings 24 can be inserted within the internal areas 6 and 7 of rolls 4 and 5. These rings permit the use of a thinner shell on the mill by giving support to same while at the same time providing extra heat exchange surface.

The following examples are presented to further illustrate the invention.

EXAMPLE I

A polybutadiene rubber having a cis content of 90 percent and a ML–4 Mooney viscosity of 57 (ASTM D1646–61) was prepared at a temperature of 86° F. using the tributylaluminum-titanium tetraiodide catalyst system of application Ser. No. 578,166, filed Apr. 16, 1956. The resulting rubber was chilled to a temperature of about 10° F. The chilled mass was then introduced to a rubber mill so adapted as to maintain the milling temperature of the rubber stock below about 80° F. and compounded in the following recipe:

| | Parts by weight |
|---|---|
| High-cis polybutadiene | 100 |
| Philblack O [a] | 50 |
| Zinc oxide | 3 |
| Stearic acid | 4 |
| Flexamine [b] | 1 |
| Sulfur | 1.6 |
| Santocure [c] | 1 |

[a] A high-abrasion furnace black.
[b] A physical mixture of a complex diarylamineketone reaction product (65%) and N,N'-diphenyl-p-phenylenediamine (35%).
[c] N-cyclohexyl-2-benzothiazolesulfenamide.

The following milling schedule was employed:

| | Time, min. | Temp., °F. |
|---|---|---|
| Breakdown [1] | 5 | 150–250 |
| | 1 | 80 |
| Compounding [2] | 4 | 80 |
| Mixing | 1 | 80 |
| Cutting | 2 | 80 |
| Rolling | 1 | 80 |
| Remilling | 3 | 80 |

[1] The rubber was added to the mill at 150° F. and broken down for 1 minute. Stearic acid was added, but the rubber would not band. Mill temperature was increased to 200° F. and then to 250° F., but the rubber failed to band. The mill was cooled to room temperature (80° F.), and the rubber banded and milled easily.
[2] Other ingredients of recipe added at this time.

EXAMPLE II

A sample of high-cis polybutadiene prepared in the same manner as in Example I and having a ML–4 Mooney viscosity of 35 was milled on a 6" by 12" roll mill at several temperatures to determine the proper temperature limits for efficient milling. The following observations were made:

90° F.—Smooth, glossy, slightly grainy, sticky, strong. Bands tightly.

130–150° F.—Dry, baggy, rough, lacy. Very loose on rolls.

110° F.—Dry, dull, baggy, lacy, weak. Bands loosely.

100° F.—Grainy, slightly translucent, stronger, bands tightly. Smooth.

During the periods when mill temperature was being changed, the mill roll varied in temperature across the width. On cooling down, the cooler side (100° F.) began to become glossy and smooth, while the hotter side (125° F.) was still dull and rough.

To be acceptable commercially a polymer should be easy to compound, it should have enough green tensile and tack to handle satisfactorily and must extrude smoothly and at a high rate. Thus, the above examples clearly indicate that at higher temperatures the compounded stocks are too short and weak to band on the roll mill and do not exhibit acceptable properties, whereas when compounded under the conditions of the present invention there is achieved satisfactory processability with the resulting milled mass exhibiting acceptable properties for further use.

It is apparent from these observations that there is a critical temperature in the range of 90° to 110° F. above which the rubber is dull, weak and loses its tendency to adhere to the roll, and below which the rubber adheres to the mill and is glossy and translucent in appearance. It is thus apparent that it is desirable to mill high-cis polybutadiene at a temperature below about 100° F., and preferably at or below about 80° F.

Reasonable variations and modifications are possible within the scope of the foregoing disclosure and the appended claims to the invention.

We claim:

1. A process for the improved compounding of a high cis polybutadiene polymer stock which comprises compounding the polymer stock in a compounding stock is pounding the polymer stock in a compounding zone wherein the temperature of the polymer stock is maintained at a temperature below 100 degrees F. by varying the shear rate in the compounding zone in response to the temperature of the polymer stock being compounded.

2. A process for the improved compounding of a high cis polybutadiene polymer stock which comprises compounding the polymer stock in a compounding zone wherein the temperature of the polymer stock is maintained at a temperature below 100 degrees F. during the compounding by the addition of a coolant directly to the polymer stock in response to the temperature of the polymer stock being compounded.

3. A process for the improved compounding of a high cis polybutadiene polymer stock which comprises chilling the polymer stock to a temperature below 10 degrees F. and thereafter compounding the polymer stock in a compounding zone wherein the temperature of the polymer stock is maintained at a temperature below 100 degrees F.

References Cited

UNITED STATES PATENTS 3,151,094   9/1964   Peterson et al. _____ 260—27

MORRIS LIEBMAN, *Primary Examiner.*

S. L. FOX, *Assistant Examiner.*

U.S. Cl. X.R.

260—41.5